W. W. KENNEDY.
SAFETY LINKS FOR DRAW BENCH CHAINS.
APPLICATION FILED MAR. 19, 1912.
1,036,641.
Patented Aug. 27, 1912.
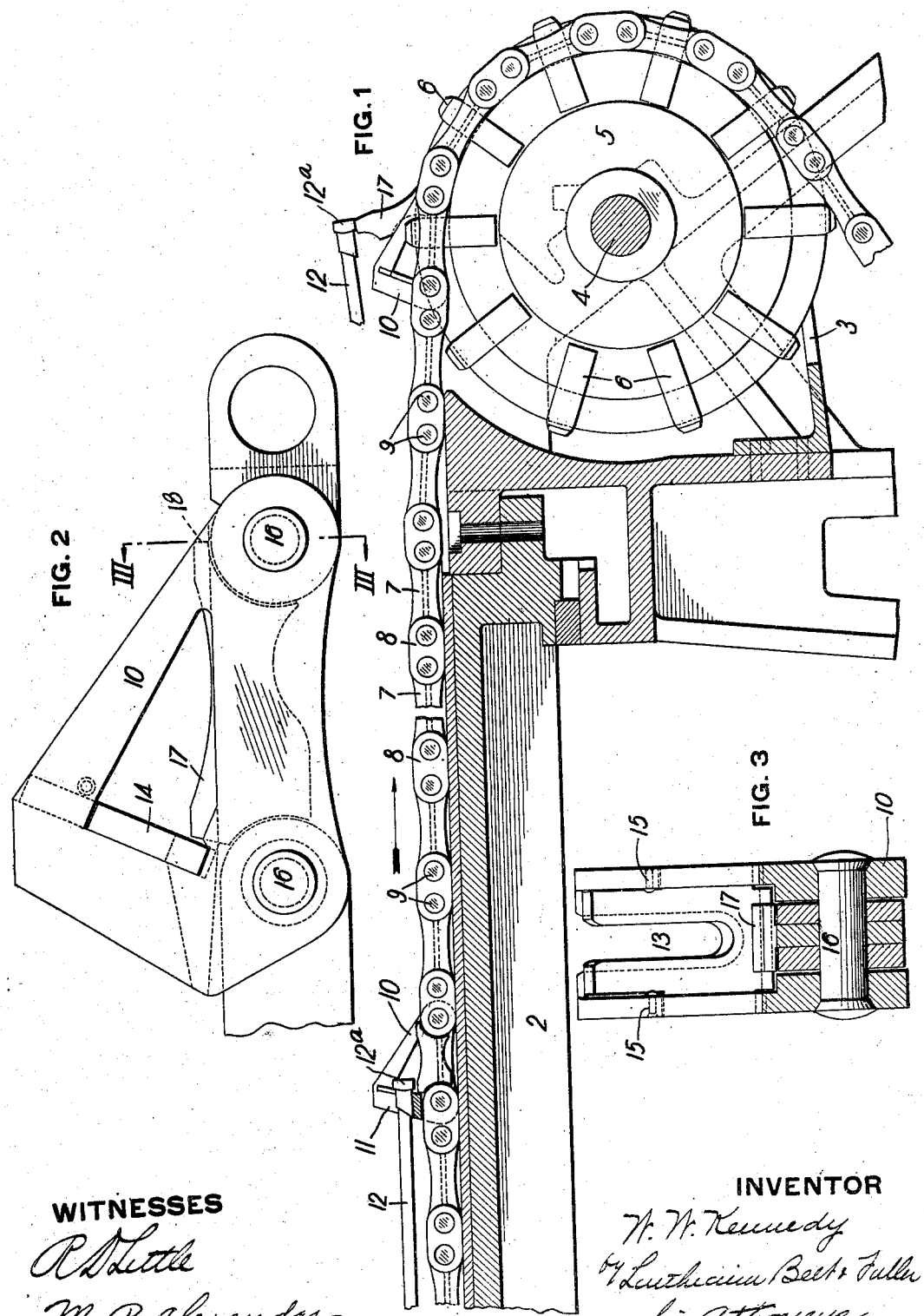
WITNESSES
INVENTOR

UNITED STATES PATENT OFFICE.

WILLIAM W. KENNEDY, OF WHEELING, WEST VIRGINIA, ASSIGNOR TO NATIONAL TUBE COMPANY, OF PITTSBURGH, PENNSYLVANIA, A CORPORATION OF NEW JERSEY.

SAFETY-LINK FOR DRAW-BENCH CHAINS.

1,036,641.   Specification of Letters Patent.   Patented Aug. 27, 1912.

Application filed March 19, 1912. Serial No. 684,790.

*To all whom it may concern:*

Be it known that I, WILLIAM W. KENNEDY, a citizen of the United States, residing at Wheeling, in the county of Ohio and State of West Virginia, have invented certain new and useful Improvements in Safety-Links for Draw-Bench Chains, of which the following is a specification.

My invention relates to apparatus used in making welded pipes and tubes and more particularly relates to the construction of the endless chains employed on the draw benches used in drawing pipes and tubes and to the construction of the hook links in the chains having means by which the tong reins are attached to the chains in the pipe or tube drawing operations.

Heretofore, the tongs, in addition to being attached to the draw chain by hand, have been detached manually from the chain, and unless the tongs are detached at the proper time or when the end of the tongs reaches a certain position on the draw bench in the pipe drawing operations, great liability of damage or breakage to the pipe drawing mechanism is incurred.

One object of this invention is to provide a safety link for draw bench chains having improved means by which the tongs are detachably secured to the chain in the pipe drawing operations and having novel means whereby the tongs are automatically released and detached from the draw chain when the tongs and a pipe held thereby reach the end of a predetermined position upon the draw bench in the pipe drawing operations.

Referring to the accompanying drawings forming part of this specification, Figure 1 is a sectional side elevation showing one end of a draw bench with a draw chain thereon having safety links forming part thereof as constructed and arranged in accordance with my invention. Fig. 2 is a detail side elevation, on an enlarged scale, of one form of safety link as constructed in accordance with this invention. Fig. 3 is a transverse section of the same, the section being taken on the line III—III of Fig. 2.

In the drawings, 2 designates the rear end of a draw bench having bearings 3 thereon in which is mounted the shaft 4 for the driving sprocket wheel 5 by which the chain is driven. The sprocket wheel 5 is provided with a series of cogs or teeth 6 which engage with the draw chain in actuating the draw chain.

The draw chain is constructed of a series of single links 7 which are connected at their ends to a series of shorter double links 8 by means of pins or rivets 9. At suitable intertervals in the length of the so-formed chain the safety links 10 are inserted, these safety links having a forked hook 11 by which the chain is attached to the end of a rein 12 of the pipe drawing tongs. The rein 12 has a button or head 12ª on its outer end and the hook is provided with a slot 13 to form the tong engaging hooks 11, as is best shown in Fig. 3. A wearing surface 14 provided on the forked hook 11, is removably held in place by means of rivets 15.

The safety links 10 have a transverse opening between the holes in the ends thereof for the rivets 16 in which a movable tong-disengaging arm 17 is pivoted by one end to one of the pins 16. The opposite end of the arm or lever 17 is adapted to engage with the button on the end of the rein 12 of the tongs when the tongs reach a predetermined position on the draw bench relative to the driving sprocket wheel 5 and the rein of the tongs is engaged by a tooth 6 of the sprocket wheel 5, so as to swing and engage with the tongs rein 12 and by lifting the end of the rein 12, clear the hook on the safety link 10 and disengage the tongs from the chain.

The draw chain formed by the links 7, 8 and 10 is endless and passes around the driving sprocket wheel 5, and an adjustable idler sprocket wheel on the opposite end of the draw bench (not shown).

A shoulder or jog 18 on the arms 17 is provided to limit the swinging movement of these arms and hold the arms in the desired position when the chain is traveling from the driving sprocket wheel toward the idler wheel at the opposite end of the endless chain.

In the operation of my improved apparatus the endless draw chain is actuated through the medium of the driving sprocket wheel 5 in the usual manner.

When the tongs are attached to the end of a pipe skelp to be drawn and welded into a pipe, the operator places the end 12ª of one of the reins within the recess or slot 13 on the closest one of the forked hooks 11 on one of the safety links 10. The draw chain, which is constantly moving in the direction of the arrow shown in Fig. 1, then engages with the button 12ª on the end of the rein 12 and draws the tongs and the pipe skelp lengthwise over the draw bench.

When the safety link 10 to which the tongs are attached reaches the position shown at the right of Fig. 1 the swinging arm 17 on the safety link 10 will be engaged by one of the teeth 6 in the driving sprocket and will be caused to lift from its engaged position shown at the left of Fig. 1 into the position shown at the right of this figure.

When one of the swinging arms 17 is moved by a tooth of the sprocket wheel 5 its outer swinging end engages with the rein 11 of the tongs and lifts the end of the rein out of the slot 13, holding the rein, the forward movement of which immediately stops, in its disengaged position until the link 10 has passed beyond the end of the tong rein. The tong rein is then grasped by a second operator and is manually disengaged from the then formed pipe attached thereto. The tongs are then removed from the draw bench and are passed back to the opposite end of the bench in readiness to be again used by the operator known as the welder in drawing another pipe, while the pipe or tube which was attached thereto is delivered transversely of its length to a cooling bed or other place of storage in the usual manner.

The advantages of my invention will be apparent to those skilled in the art.

By the use of my improved safety link the draw chains are automatically disconnected or disengaged from the rein of the tongs when the reins reach the end of the draw bench and liability of breakage or other damage to the apparatus is avoided and overcome.

Modifications in the construction and arrangement of the parts may be made without departing from my invention. Instead of utilizing the driving sprocket chain to actuate the swinging arms 17 of the hook links 10 in disengaging the tongs from the chain, an idler sprocket wheel may be located at the desired position in the length of the bench, the teeth of which move the arms to lift the tongs and free the chain, and other changes may be made within the scope of the appended claims.

I claim:—

1. In a pipe drawing bench, an endless sprocket chain, at least one link of said chain having a forked tongs-engaging hook thereon, a sprocket wheel for driving said chain, means on the forked link whereby the tongs are automatically disengaged from the hook link and mechanism to engage and actuate said means at a predetermined position on said draw bench to disengage the tongs.

2. In a pipe drawing bench, an endless sprocket chain, hook links at intervals in the length of said chain having tongs-engaging forks thereon, a sprocket wheel for driving said chain, means on the forked links whereby the tongs are automatically disengaged from the hook links and mechanism to engage and actuate said means at a predetermined position on said draw bench to disengage the tongs.

3. In a pipe drawing bench, an endless sprocket chain, at least one link of said chain having a forked tongs-engaging hook thereon, a sprocket wheel for driving said chain, a swinging arm pivoted to said forked hook link arranged to swing and contact with the tongs to disengage the tongs from the chain, and means for actuating said arm at a predetermined position on said draw bench to disengage the tongs.

4. In a pipe drawing bench, an endless sprocket chain, hook links at intervals in the length of said chain having tongs-engaging forks thereon, a sprocket wheel for driving said chain, swinging arms pivoted to said forked hook links arranged to swing and contact with the tongs to disengage the tongs from the chain, and means for actuating said arms to disengage the tongs at a predetermined position on said draw bench to disengage the tongs.

5. In a pipe drawing bench, an endless sprocket chain, at least one link of said chain having a forked tongs-engaging hook thereon, a sprocket wheel for driving said chain, and mechanical means on the forked link whereby the tongs are automatically disengaged from the hook, said means being actuated by engagement with the teeth of the chain driving sprocket wheel.

6. In a pipe drawing bench, an endless sprocket chain, hook links at intervals in the length of said chain having tongs-engaging forks thereon, a sprocket wheel for driving said chain, and mechanical means on the forked links whereby the tongs are automatically disengaged from the hook links at a predetermined position on said draw bench, said means being actuated by engagement with the teeth of the chain driving sprocket wheel.

In testimony whereof, I have hereunto set my hand.

WILLIAM W. KENNEDY.

Witnesses:
T. E. BODLEY,
E. W. ZINN.